(12) United States Patent
Salam et al.

(10) Patent No.: US 9,019,840 B2
(45) Date of Patent: *Apr. 28, 2015

(54) CFM FOR CONFLICTING MAC ADDRESS NOTIFICATION

(71) Applicant: Cisco Technology, Inc., San Jose, CA (US)

(72) Inventors: Samer Salam, Vancouver (CA); Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/846,201

(22) Filed: Mar. 18, 2013

(65) Prior Publication Data

US 2013/0229924 A1 Sep. 5, 2013

Related U.S. Application Data

(63) Continuation of application No. 12/651,733, filed on Jan. 4, 2010, now Pat. No. 8,416,696.

(51) Int. Cl.
*H04L 12/26* (2006.01)
*H04L 29/12* (2006.01)

(52) U.S. Cl.
CPC ............ *H04L 61/10* (2013.01); *H04L 43/0811* (2013.01); *H04L 43/10* (2013.01)

(58) Field of Classification Search
USPC .......................... 370/241–254, 395.5–395.52; 709/223–224
See application file for complete search history.

(56) References Cited

U.S. PATENT DOCUMENTS

| | | |
|---|---|---|
| 6,345,294 B1 | 2/2002 | O'Toole et al. |
| 6,434,627 B1 | 8/2002 | Millet et al. |
| 6,865,613 B1 | 3/2005 | Millet et al. |
| 7,281,036 B1 | 10/2007 | Lu et al. |
| 7,336,622 B1 | 2/2008 | Fallis et al. |
| 7,356,009 B1 | 4/2008 | Meier et al. |
| 7,480,710 B1 | 1/2009 | Olson et al. |
| 7,545,820 B2 | 6/2009 | Duvvury |
| 7,610,375 B2 | 10/2009 | Portolani et al. |
| 7,624,164 B2 | 11/2009 | Lu et al. |
| 7,636,349 B2 | 12/2009 | Pearce et al. |
| 7,898,965 B2 * | 3/2011 | Mohan et al. ............... 370/241 |
| 7,996,559 B2 * | 8/2011 | Mohan et al. ............... 709/242 |
| 8,175,008 B1 | 5/2012 | Rustagi et al. |

(Continued)

OTHER PUBLICATIONS

IEEE Std 802.1ag, Virtual Bridged Local Area Networks Amendment 5: Connectivity Fault Management, 260 pages, Sep. 2007.

(Continued)

*Primary Examiner* — Frank Duong
(74) *Attorney, Agent, or Firm* — Novak Druce Connolly Bove + Quigg LLP (57) ABSTRACT

In one embodiment, an aggregation device is configured to aggregate traffic of a plurality of customer edge (CE) devices into a single bridge-domain. The aggregation device receives connectivity fault management (CFM) packets of a CFM protocol from the plurality of CE devices. Each received CFM packet includes a media access control (MAC) address of an access port of the CE device from which the CFM packet was transmitted. The aggregation device detects conflicting MAC addresses between access ports of CE devices by comparing MAC addresses of the received CFM packets. The aggregation device notifies one or more of the plurality of CE devices of the conflict.

20 Claims, 6 Drawing Sheets

(56) References Cited

U.S. PATENT DOCUMENTS

| | | |
|---|---|---|
| 2005/0207414 A1 | 9/2005 | Duvvury |
| 2005/0213560 A1 | 9/2005 | Duvvury |
| 2006/0140164 A1 | 6/2006 | Patel et al. |
| 2007/0014290 A1 | 1/2007 | Dec et al. |
| 2008/0301755 A1 | 12/2008 | Sinha et al. |
| 2011/0164505 A1 | 7/2011 | Salam et al. |

OTHER PUBLICATIONS

ITU-T Recommendation Y.1731, OAM Functions and Mechanisms for Ethernet based Networks, 80 pages, May 2006.

* cited by examiner

MIP CCMDB 500

| BRIDGE DOMAIN 505 | MEP ID 510 | MAC SOURCE ADDRESS 515 | INCOMING PORT 520 |
|---|---|---|---|
| "X" | MEP 1 | "M1" | A (MEP 3) |
| "X" | MEP 2 | "M2" | B (MEP 4) |
| ... | ... | ... | ... |

ENTRIES 550

FIG. 6

CFM FOR CONFLICTING MAC ADDRESS NOTIFICATION

RELATED APPLICATIONS

The present application is a continuation of U.S. patent application Ser. No. 12/651,733 filed on Jan. 4, 2010 by Samer Salam, et al., entitled "CFM for Conflicting MAC Address Notification", the contents of which are incorporated by reference herein in their entirety.

TECHNICAL FIELD

The present disclosure relates generally to computer networks, and, more particularly, to managing Media Access Control (MAC) address conflicts within computer networks.

BACKGROUND

For Ethernet aggregation/backhaul of Layer 3 services, conflicting customer MAC addresses may occur (e.g., for customer edge routers or customer premises equipment, or "CEs/CPEs"), especially given the diverse set of Ethernet equipment manufacturers that may not adhere to the standard that each device have a unique MAC address. For example, for a service provider with millions of DSL (digital subscriber line) ports, there can be a number (e.g., hundreds) of duplicate MAC address alarms active on the DSLAMs (DSL access multiplexers) at any point of time where two of the same MAC addresses appear on the same DSLAM. When such overlapping addresses occur, the CEs/CPEs often experience traffic black-holing without any corresponding feedback from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an aggregation device operating in a computer network may have a down maintenance end point (MEP) configured on certain of its user-to-network interface (UNI) ports. These down MEPs may then receive continuity check messages (CCMs) from down MEPs configured on customer edge (CE) devices, where each CCM has a media access control (MAC) address of a corresponding CE device UNI port from which the CCM is transmitted. In response to detecting conflicting MAC addresses between CE device UNI ports based on the CCMs, the aggregation device may notify the CE devices corresponding to the conflicting MAC addresses of the conflict. In one or more embodiments, the CE devices may initiate an indication of the conflict (e.g., error lights, log entries, etc.), such that, for example, the conflicting MAC address issue may be resolved.

DESCRIPTION

Network Architecture

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge (or switch) may be used to provide a "bridging" (or "switching") function between two or more LANs. Typically, the bridge is a computer and includes a plurality of ports that are coupled to the LANs. Ports that are coupled to LANs that are, in turn, coupled to other bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address. Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may reassemble or convert received data frames from one LAN standard (e.g., Ethernet) to another (e.g. token ring). Thus, Layer-3 devices are often used to interconnect dissimilar subnetworks.

Figure 1:
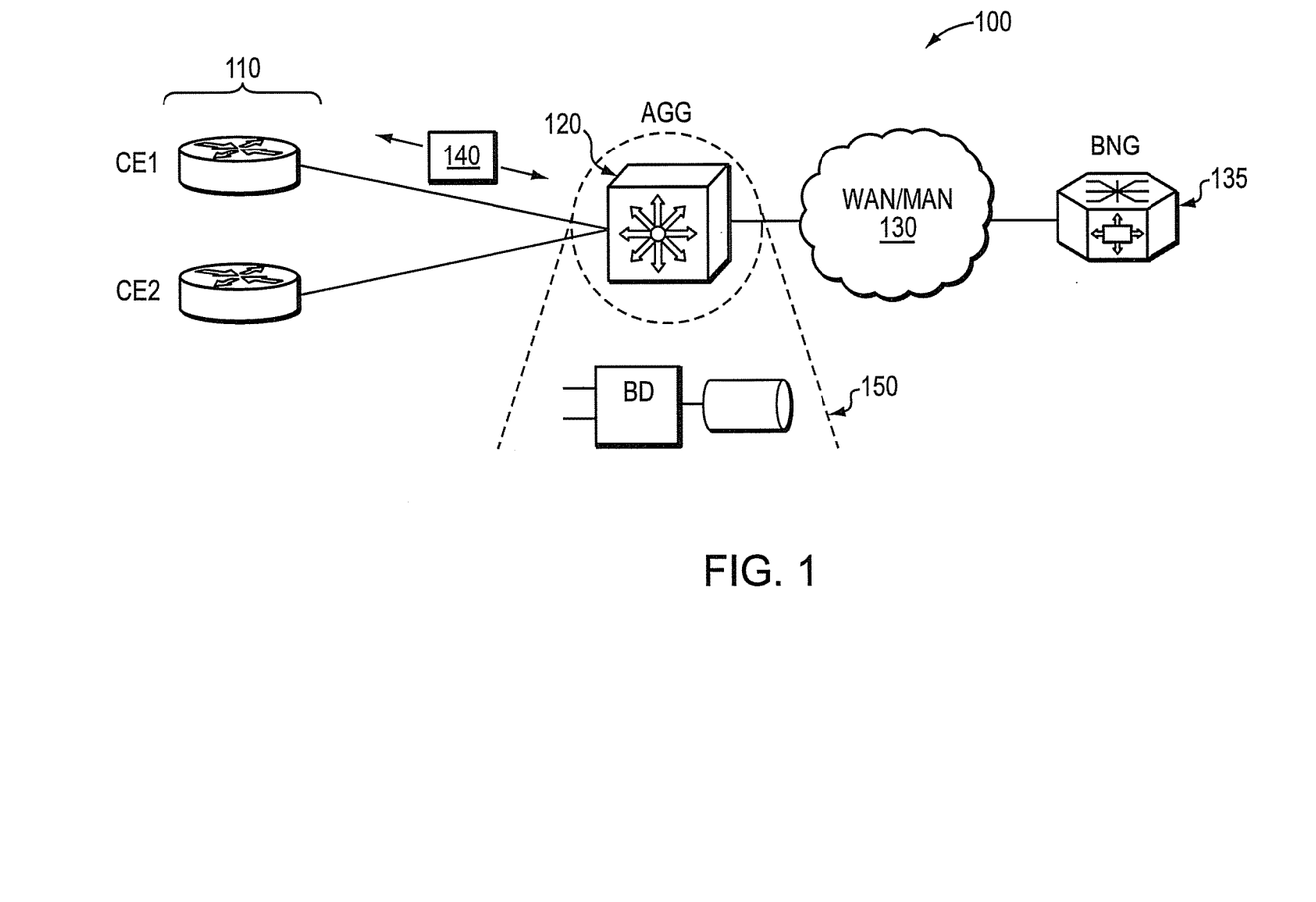
FIG. 1 illustrates an example computer network.

FIG. 1 is a schematic block diagram of an example computer network 100 illustratively comprising nodes/devices, such as one or more customer devices 110 ("CEs," generally) interconnected to a Wide Area Network (WAN) or Metropolitan Area Network (MAN) 130 by an aggregation switch/device ("AGG") 120 as shown. Illustratively, a Broadband Network Gateway (BNG) 135 is shown attached to the WAN/MAN 130, such that, as shown in alternate view 150, the AGG places traffic from the CEs into a single bridge domain (BD)

that's associated with a transport pipe (e.g., a pseudo wire) to backhaul traffic over the WAN/MAN 130 to the BNG. Traffic (data packets/frames 140) may be exchanged among the nodes/devices of the computer network 100 using predefined network communication protocols such as the Transmission Control Protocol/Internet Protocol (TCP/IP), User Datagram Protocol (UDP), Internet Packet Exchange (IPX) protocol, etc. Those skilled in the art will understand that any number of nodes, devices, links, etc. may be used in the computer network, and that the view shown herein is for simplicity. Also, while the embodiments described herein are described generally with regard to Ethernet networks (e.g., Carrier Ethernet), they may apply to any suitable network. The computer (e.g., bridged) network 100 of FIG. 1 is meant for illustration purposes only and is not meant to limit the embodiments described herein.

Figure 2:
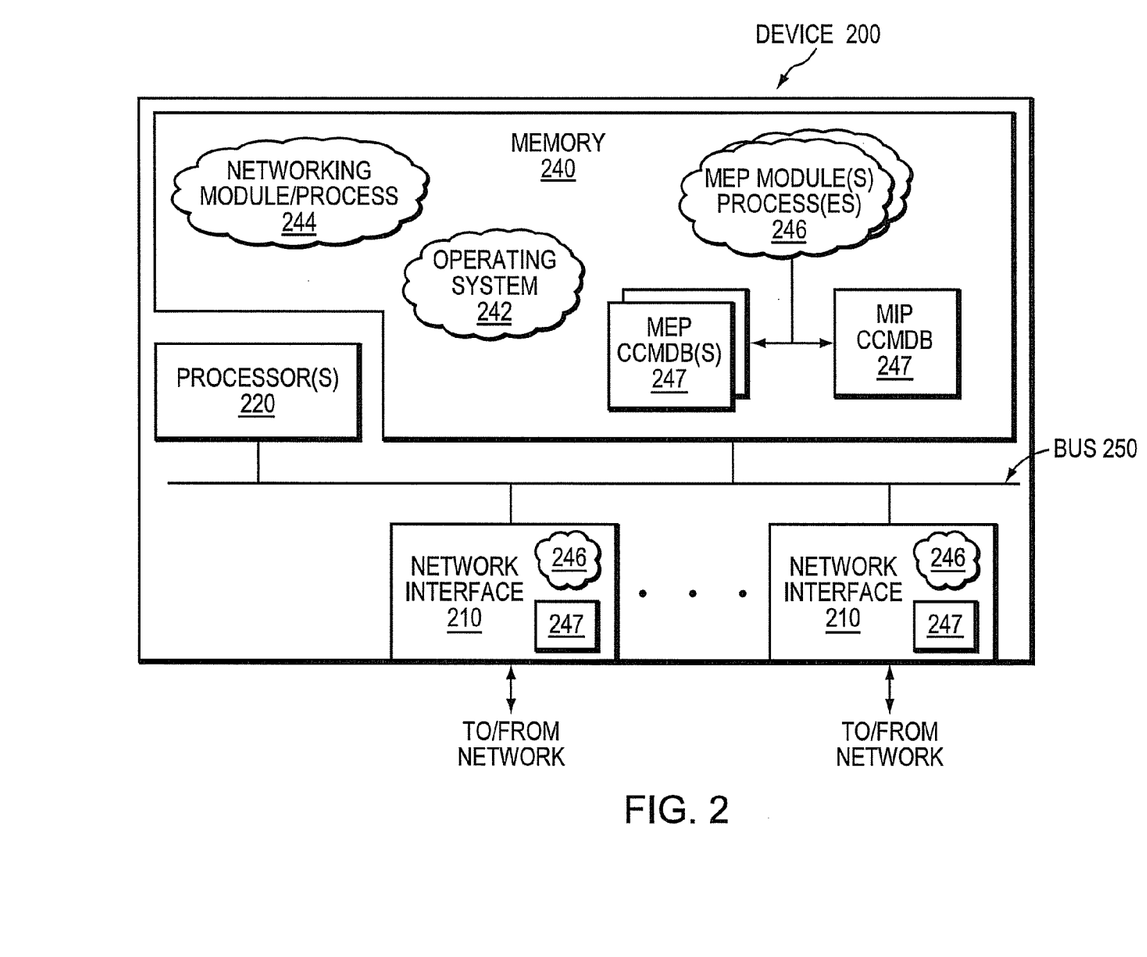
FIG. 2 illustrates an example network device/node.

FIG. 2 is a schematic block diagram of an example node/device 200 that may be used with one or more embodiments described herein, e.g., as a device corresponding to a CE device 110 or an aggregation device 120 (with various features that may be specific to each, as used and described herein). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (frames) using a variety of different communication protocols over physical links or wireless links. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture. Notably, at least from the perspective of the aggregation devices 120, network interfaces 210 that are adapted to communicate with one or more CE devices 110 are generally referred to as user-to-network interface (UNI) ports (or customer facing interfaces).

The memory 240 comprises a plurality of storage locations that are addressable by the processor(s) 220 and the network interfaces/ports 210 for storing software programs and data structures associated with the embodiments described herein. The processor(s) 220 may comprise necessary elements or logic adapted to execute the software programs and manipulate the data structures, such as one or more "MEP CCM DBs" 247 or a "MIP CCM DBs" 500, each as described herein. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. It will be apparent to those skilled in the art that other types of processors and memory, including various computer-readable media, may be used to store and execute program instructions pertaining to the inventive technique described herein.

Portions of the device 200 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustratively simplified "networking module" (or "networking process") 244, along with an illustrative "MEP" module/process 246, as described herein (both shown stored/executed within memory 240 as one example implementation).

Networking module/process 244 contains computer executable instructions executed by the processor(s) 220 to perform various functions relating to networks in general, as may be appreciated by those skilled in the art. For instance, a communication process/service of module process 244 may perform functions provided by one or more communication protocols, such as various switching/bridging (e.g., L2) protocols, such as on aggregation device 120, or routing (e.g., L3) protocols (e.g., CE devices 110). These functions may be configured to manage databases (e.g., spanning tree instances), filtering databases (FDBs), or routing/forwarding information databases (RIBs/FIBs) containing, e.g., data used to make switching/forwarding decisions, which may respectively converge the network in response to topology changes.

As noted, service providers may offer its customers (e.g., residential subscribers) various L3 services, such as high-speed Internet access, which may result in the utilization of L3 routers at the subscriber's premises. Such Ethernet aggregation (and/or backhaul) of Layer 3 services may create an opportunity for conflicting customer MAC addresses on the customer equipment (e.g., CEs or CPEs, or simply "CEs" herein). Particularly, though the wide range of customer equipment manufacturers should each create devices with uniquely identifying MAC addresses (e.g., per the IEEE's assignment of OUI numbers and corresponding MAC address ranges), many simply re-use their available MAC addresses on multiple devices. When using an L2 bridge as an aggregation device 120 to interconnect network-facing devices 110 with such overlapping addresses, problems differentiating the devices may occur, and incorrect traffic forwarding or undesired blackholing (dropping traffic) may result.

Various bridges/switches today (e.g., DSLAMs) are able to implement "port security" features that can detect overlapping addresses and trigger a violation response, such as by shutting down traffic to/from the impacted CE. For example, the port security shuts down traffic to/from a MAC address if the address appears on more than a single port, e.g., for the same VLAN (or bridge-domain). In this instance, the CEs/CPEs experience traffic black-holing without feedback from the network to inform the device with conflicting MAC address of what is happening on the aggregation device.

Conflicting MAC Address Management

Consider two customer edge routers, CE1 and CE2 (of FIG. 1) connected to an aggregation switch (AGG). Traffic from both CEs may be aggregated into a single bridge-domain for the purpose of backhauling the traffic to the Core Network (WAN/MAN 130). For instance, the traffic may be backhauled over a tunnel such as an Ethernet over Multi-Protocol Label Switching Pseudo Wire (EoMPLS PW). The noted problem arises when the MAC address of CE1 and the MAC address of CE2 are the same, and then how are CE1 and/or CE2 notified of this condition.

According to one or more embodiments of the disclosure, then, CE devices 110 and aggregation devices 120 may have a down maintenance end point (MEP) configured on their corresponding user-to-network interface (UNI) ports 210 (those facing each other), such as in accordance with Connectivity Fault Management (CFM). These down MEPs may then be configured to send and receive continuity check messages (CCMs), where each CCM from a CE device has a MAC address of the corresponding CE device UNI port from which the CCM is transmitted. In response to detecting conflicting MAC addresses between CE device UNI ports based on the CCMs, the aggregation device may notify the CE device(s) corresponding to the conflicting MAC address(es) of the conflict. In one or more embodiments, the CE devices may initiate an indication of the conflict (e.g., error lights, alarms, logged entries, etc.), such that, for example, the conflicting MAC address issue may be resolved.

Illustratively, the techniques described herein may be performed by hardware, software, and/or firmware, and may leverage and extend Ethernet management protocols running between the CE devices 110 and the aggregation device 120 in order to inform the CE devices of a conflicting MAC address condition. That is, the logic on the aggregation device (provider equipment) may be configured to manage and detect MAC address overlap (e.g., the DSLAMs may use MAC tables and data plane learning) and, particularly, to notify the CE devices of the overlaps. As described below, the MAC address overlap detection is based within the control plane (protocol), thus safeguarding against MAC moves (CE devices moving from one port to another on the aggregation device), where the data plane cannot distinguish such rewiring from true MAC address overlaps. Note that the embodiments herein may be incorporated into hosts or routed CEs, and as such may be applied to both Enterprise and service provider network applications.

Figure 3:
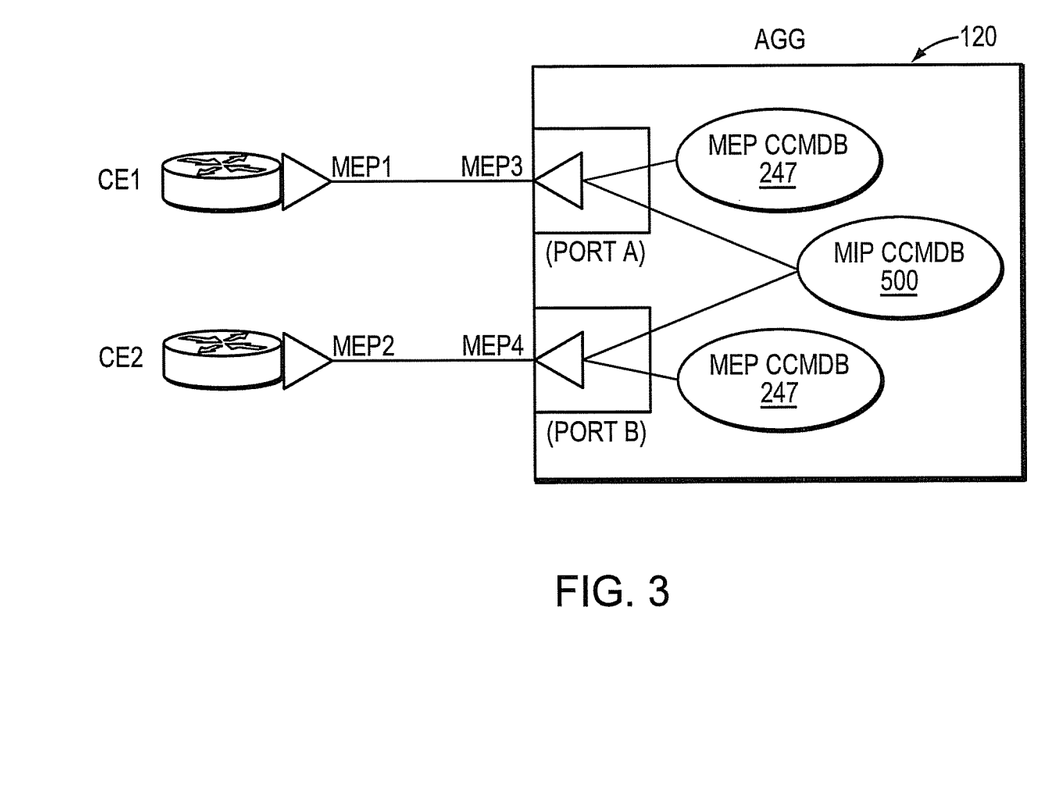
FIG. 3 illustrates an example Maintenance End-Point (MEP) configuration.

Operationally, each CE device is equipped with a down MEP on its uplink port (the port facing/communicating with the aggregation device), and the UNIs (access ports) of the aggregation device are equipped with a down MEP as well. For example, as shown in FIG. 3, CE1 may be configured with MEP 1, CE2 may be configured with MEP 2, and the aggregation device AGG may be configured with MEP 3 and MEP 4 on corresponding ports as shown, respectively. As those skilled in the art will understand, a down MEP is a MEP adapted to communicate through a connected wire (a port 210), and not through the backplane of the device (i.e., "up" MEPs). That is, assuming two ports on a CE device 110, a first facing the customer and a second facing the aggregation device 120, a down MEP on the first port faces the customer, while an up MEP faces the network (aggregation switch). Conversely, on the second port, and the port of interest herein, a down MEP faces the network (aggregation switch), while an up MEP faces the customer (i.e., through the CE device's backplane).

The respective down MEPs may be illustratively embodied as instances of a MEP module/process 246, which contains computer executable instructions executed by the processor(s) 220 to perform various functions relating to network maintenance and/or management in general, as may be appreciated by those skilled in the art, and in accordance with the novel techniques described herein. In particular, with regard to service OAM (operation, administration, and management), the IEEE Std. 802.1ag-2007 (e.g., and ITU-T Y.1731) describes Connectivity Fault Management (CFM) protocols that work together to help administrators debug networks, e.g., Ethernet networks. These protocols include, among other things, a continuity check protocol, a loopback protocol, and a linktrace protocol. In particular, the continuity check portion of the protocol describes how "heartbeat" messages (continuity check messages or "CCMs") may be issued periodically by maintenance end-points (MEPs) to allow MEPs to detect a loss of service connectivity amongst themselves and to allow MEPs and maintenance intermediate points (MIPs) to discover MEPs within a domain. Further, those skilled in the art will understand that a "maintenance association" generally implies all particular MEPs that are part of a same maintenance domain (e.g., which is comprised of all devices owned and operated by an entity/organization, such as a service provider or an enterprise) and a same service, though as used herein may illustratively be referred to simply as a "network" that is comprised of the particular MEPs.

Notably, while MEP process 246 is shown as a centralized process within memory 240, an alternative embodiment may illustratively have a MEP process 246 located within ports/interfaces 210 (e.g., along with a separate MEP CCM DB 247 per configured port, as well, described below). For instance, any port 210 of a device 200 can be configured as a maintenance point (e.g., MEP or MIP, or a "transparent point" as defined in the protocol) where, a MEP is a particular instance of a network element/bridge, that is, one of a plurality of MEPs hosted by the bridge. MEPs reside at the edge of a maintenance domain, whereas MIPs are internal to the domain. Hence, a MIP will forward CFM packets (unless it is a CFM message destined for that MIP), while MEPs do not forward CFM packets at their maintenance level because they must keep them within the domain. (A MEP will forward CFM packets as long as they are part of a higher-level domain.) In certain embodiments, MEPs may also individually correspond to an associated VLAN on the respective port 210, as may be appreciated by those skilled in the art (i.e., Port MEPs or VLAN MEPs).

According to one or more embodiments herein, the down MEPs configured on the CE devices 110 transmit CCMs to the corresponding down MEPs configured on the aggregation device's UNI port. These CCMs carry the MAC address of the CE device's UNI port on which the down MEP is configured, and thus from which the CCM is transmitted. Illustratively, this MAC address corresponds to the MAC address as used by IP traffic transmitted on the outbound port of the CE device.

Figure 4:
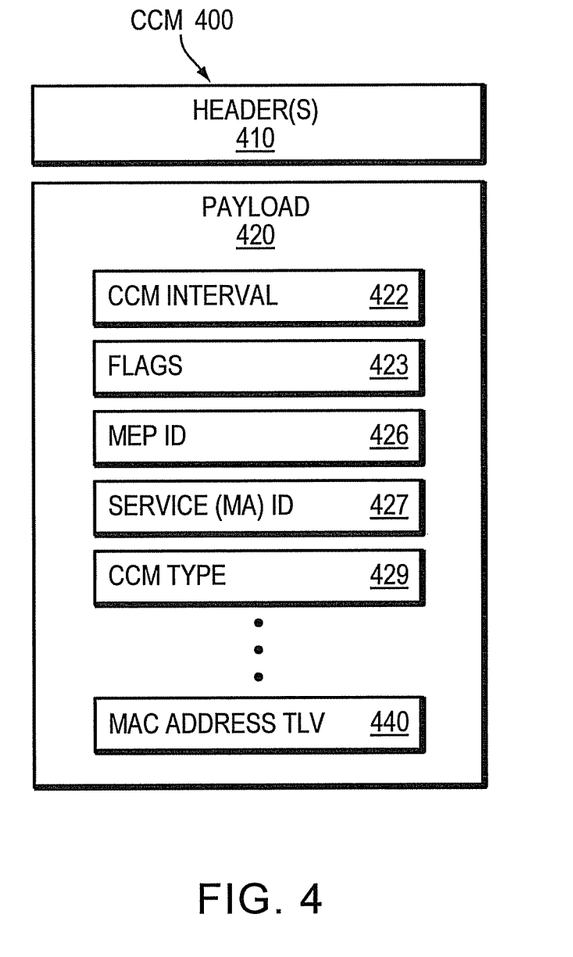
FIG. 4 illustrates an example continuity check message (CCM)

FIG. 4 illustrates an example message 400 that may be a continuity check message (CCM) in accordance with one or more embodiments described herein. Note that while an example format is shown, other formats carrying similar applicable information may be used. The illustrative CCM 400 may include a header 410, often including a MAC address, and a payload 420, as may be appreciated by those skilled in the art. Payload 420 may comprise a number of fields for carrying various information, such as a CCM interval 422, flags 423, MEP ID 426, a service ID 427, and a CCM type 429. Notably, payload 420 may be arranged as one or more TLVs (type, length, value objects) 420 and sub-TLVs, such as a MAC address TLV 440. The CCM interval field, which generally indicates a time between CCMs, may be set to a standard rate, or to a particularly lengthy period of time. Specifically, in one embodiment, the message need only be sent once when the CE device is first initialized with a MAC address. Other factors may necessitate a more regular CCM interval, such as MAC address changes occurring at the CE device, expiration of CCM entries at the aggregation device (described below), etc.

Figure 5:
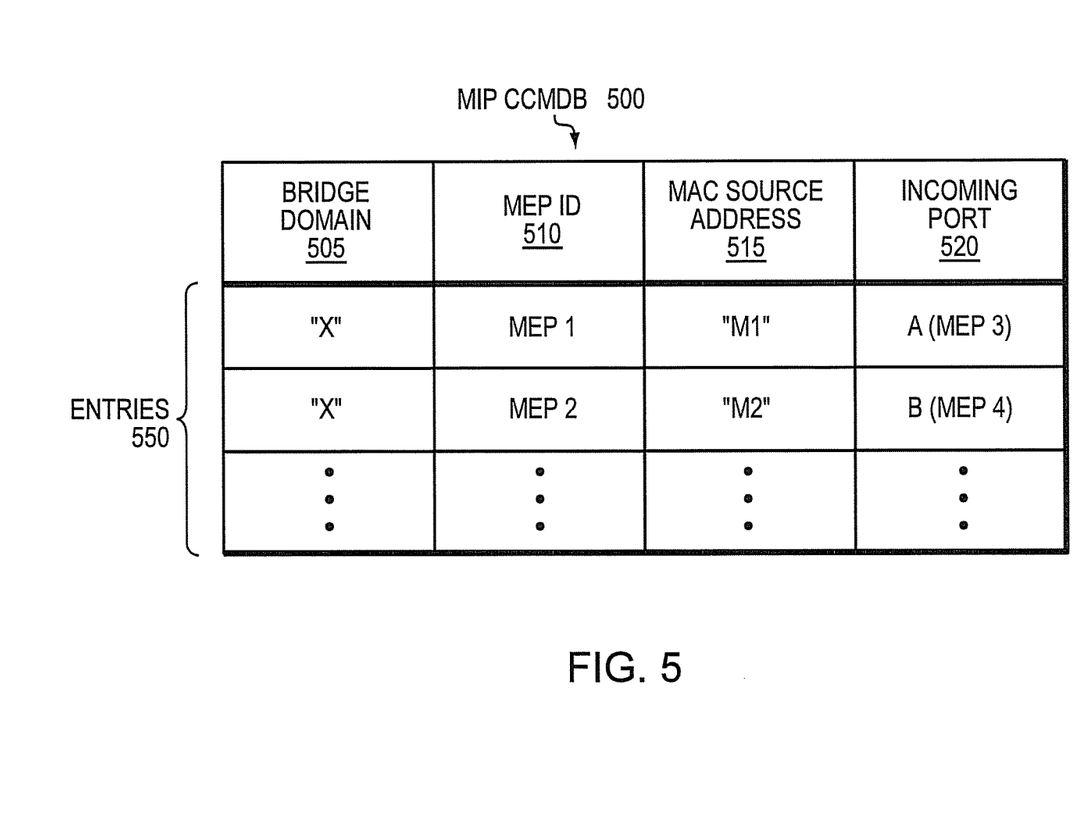
FIG. 5 illustrates an example Maintenance Intermediate-Point CCM Database (MIP CCMDB)

The aggregation device 120 may then receive the CCMs 400 on each of its down MEPs on its CE/user-facing ports. In accordance with one or more embodiments herein, the aggregation device 120 implements a MIP CCM Database (CC-MDB, sometimes referred to in the art as a CCDB), illustratively per IEEE Std. 802.1ag-2008. For instance, each MEP (e.g., MEP 3 and MEP 4) may comprise its own MEP CCMDB 247, which catalogues the received CCM information for each respective MEP. The MEPs (e.g., 3 and 4) may then combine their databases into a MIP CCMDB 500. In other words, as MEP 1 and MEP 2 transmit CCMs 400 to the aggregation device, MEP 3 and MEP 4 (respectively) catalogue the received information in their respective MEP CCMDBs 247. The CCM information received generally comprises the fields of message 400, such as a bridge domain in which the CCM was transmitted, a MEP identifier (ID) of the down MEP from which the CCM was transmitted, and a MAC source address of the CE device UNI port from which the CCM was transmitted.

Each down MEP at the aggregation device may then, in turn, populate the MIP CCMDB 500, such that the MIP CCMDB catalogues information for all CCMs that all MEPs received from all of the aggregation device's ports—thus, listing all of the MAC addresses the aggregation device has learned. FIG. 5 illustrates an example arrangement of a MIP CCMDB 500, from the perspective of the AGG aggregation device. Those skilled in the art will appreciate that the view 500 is a simplified illustration of the list as it is generally used for continuity checking, e.g., as part of the CFM protocol mentioned above. CCMDB 500 may comprise various fields for entries 550, such as a bridge domain field 505, a MEP ID field 510, and a MAC source address field 515, as learned from the CCMs 400, as well as an incoming port ID field 520 for indicating on which port the CCM was received at the aggregation device (e.g., port A or B).

Assume, as an example, that CE 1 has MAC address "M1", CE 2 has MAC address "M2", and that AGG places both CE 1 and CE 2 in bridge-domain "X." At steady state, and assuming normal operation with no overlapping MAC addresses, the various CFM DBs will contain the following information (on the AGG node):

MEP 3 CCMDB (247):
Bridge domain X, MEP 1, MAC M1;
MEP 4 CCMDB (247):
Bridge domain X, MEP 2, MAC M2; and
AGG's MIP CCMDB (500):
Bridge domain X (505), MEP 1 (510), MAC M1 (515), learnt via Port A (520); and
Bridge domain X (505), MEP 2 (510), MAC M2 (515), learnt via Port B (520).

The aggregation device may implement logic within MEP process 246 (e.g., at each port), such as in the form of an illustrative MEP Continuity Check Receiver and MEP Continuity Check Initiator, in order to detect and notify CE devices of conflicting (i.e., duplicate) MAC addresses. Specifically, on the aggregation device 120, each MEP (e.g., in its respective Continuity Check Receiver module) checks if a newly learnt MEP MAC Source Address has been catalogued against another Incoming Port (for the same bridge-domain). This check may be performed by consulting the aggregation device's MIP CCMDB 500 (i.e., valid, non-expired entries), as it has a global view of all MAC addresses learnt via all MEPs at the device. In other words, by comparing a received MAC address in a received CCM to MAC addresses in the CCMDB 500 corresponding to any UNI port of the aggregation device, conflicting MAC addresses may be detected by determining that the received MAC address is already located within the CCMDB for a different CE device UNI port.

Continuing the example, assume that CE 1 and CE 2 have overlapping MAC addresses, where M1=M2="M." Furthermore, assume that the aggregation device AGG receives CE1's CCMs 400 before those of CE 2. In this case, MEP 3 catalogues the CCM information in its MEP CCMDB 247, as well as populating the MIP CCMDB 500 (as above, where M1=M). Now, when MEP 4 receives CCMs from CE 2, MEP 4 consults the MIP CCMDB 500 to determine whether MAC address "M" has been learnt via another interface. MEP 4 discovers that MAC M has been learnt against port A (as opposed to its own port B), and may thus enter a novel "Conflicting MAC" state, and may begin to notify one or more of the CE devices corresponding to the conflicting MAC addresses (e.g., CE 2) of the conflict.

Upon transitioning to a Conflicting MAC state, the conflict-detecting MEP may begin to transmit returned CCMs with a notification to the conflicting MAC addressed CE device (i.e., to its down MEP). The notification may be in the form of an asserted remote defect indication (RDI) bit, a particular set flag, or a type/length/value field entry within the returned CCM. Notably, the returned CCMs may be sent to the CE device having a UNI port that transmitted a CCM with a MAC address conflicting with a MAC address of a UNI port of another CE device previously known by the aggregation device (e.g., to only MEP 2), or, conversely, the aggregation device may transmit a notification to each CE device having a UNI port with a conflicting MAC address (for redundancy in subsequent action, described below). Also, in one embodiment, the aggregation device may transmit a notification (e.g., a notification CCM) to a conflicting CE device to request that the CE device use a particular VLAN without a conflicting MAC address. In particular, this is effective due to the fact that duplicate MAC addresses in separate VLANs are typically allowed.

The CE device(s) receiving the overlapping MAC notification (e.g., CE 2) may then initiate an indication of the conflicting MAC address, such as an alarm or log entry to alert an administrator. For instance, example indications may comprise raising a simple network management protocol (SNMP) trap, setting an error indicating light on the CE device, sending a notification message to an administrator, or entering a system log (syslog) entry. A system administrator or other authorized user may then attempt to remedy the situation, such as by changing a corresponding MAC address configuration of the conflicting UNI port, or replacing the device. Further, according to one embodiment mentioned above, the CE device (or administrator) may change the VLAN in which the conflicting MAC address is being used to alleviate the overlap, accordingly.

Notably, in addition to checking the MAC addresses for conflicts, additional logic may be configured such that the MEP ID corresponding to the MAC address is also checked within the respective databases (e.g., MIP CCMDB 500). For instance, a same MAC address having a same MEP ID on a different port could be the same device that has moved prior to expiration of the previously logged entry. At the same time, however, if the MAC addresses overlap, but a different MEP ID is used, then it is probable that the overlapping MAC addresses are different conflicting devices (e.g., including where the overlap occurs on the same port of the aggregation device). Accordingly, detecting a conflicting MAC address may further include determining that a received MAC address of a received CCM is already located within the CCMDB for a different MEP ID than the MEP ID contained within the received CCM.

Figure 6:
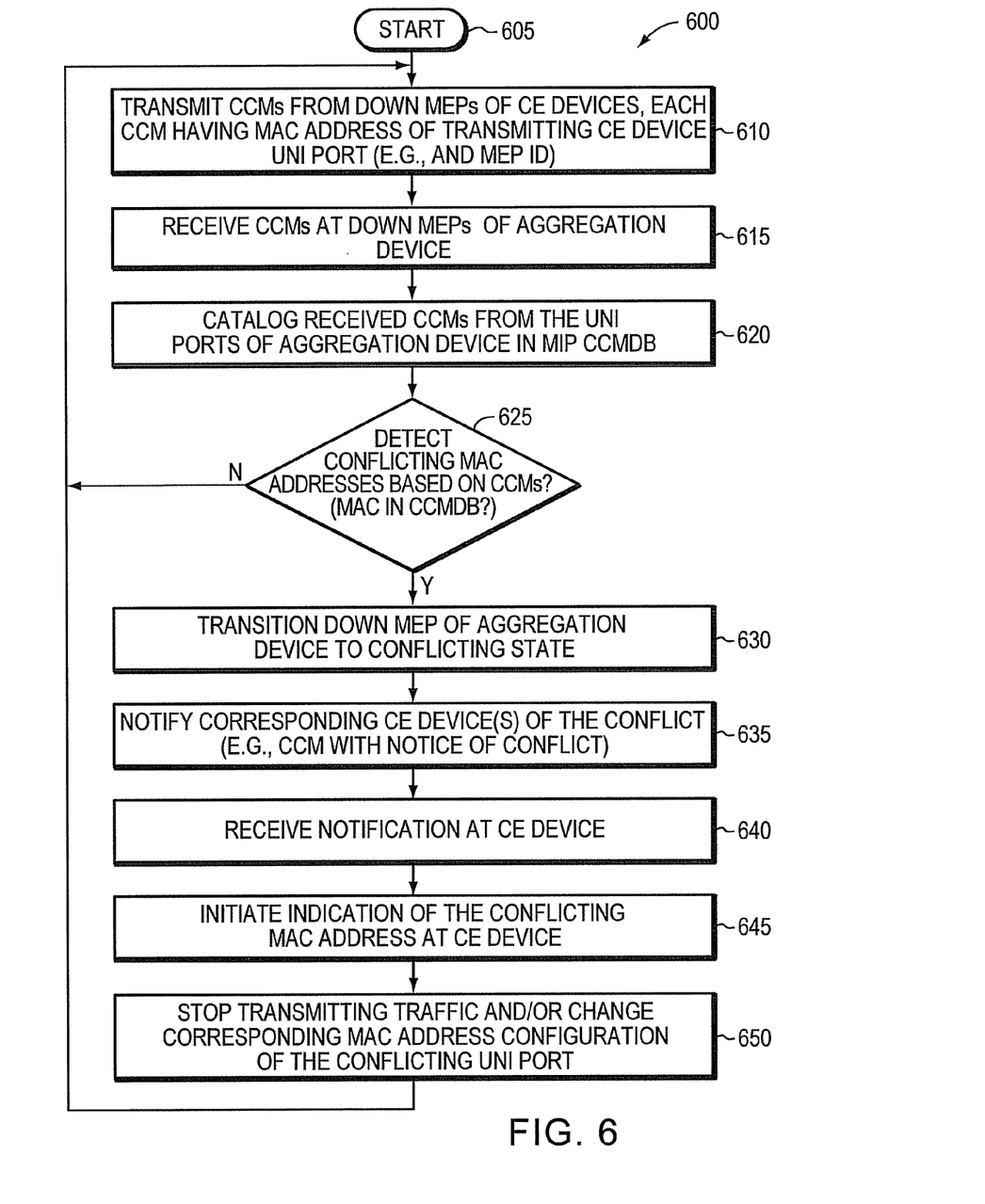
FIG. 6 illustrates an example procedure for providing a feedback mechanism to customer devices having a conflicting MAC address.

FIG. 6 illustrates an example procedure for providing a feedback mechanism to customer devices having a conflicting MAC address in accordance with one or more embodiments described herein. The procedure 600 starts at step 605 (e.g., where the devices are configured as described above), and continues to step 610, where CCMs 400 may be transmitted from down MEPs of CE devices 110 (e.g., MEPs 1 and 2), where each CCM contains the MAC address of the transmitting CE device's UNI port, e.g., in the header 410 or illustrative MAC address TLV 440 (e.g., along with MEP ID 426). The CCMs may then be received in step 615 at the respective down MEPs of the aggregation device 120 (e.g., MEPs 3 and 4), which in step 620 may catalog the received information from the CCMs into the MIP CCMDB 500.

In response to detecting conflicting MAC addresses based on the CCMs in step 625 (that is, in response to the received MAC address already being in the CCMDB 500), then in step 630 the corresponding down MEP of the aggregation device may be transitioned to a conflicting state, where in step 635 it notifies the corresponding CE device(s) of the conflict. For example, as mentioned above, the notification may be in the form of a returned CCM with a notice of the conflict, etc. Once a CE device receives the notification in step 640, it may then initiate, in step 645, an indication of the conflicting MAC address at CE device (e.g., lights, errors, etc.), and in step 650 may stop transmitting traffic and/or may change the corresponding MAC address configuration of the conflicting UNI port (e.g., dynamically or manually via an administrator's responsibility). The procedure 600 may then return to step 610 to continue transmitting CCMs to check for conflicting MAC addresses (e.g., newly configured MAC addresses).

The novel techniques described herein provide a feedback mechanism to customer devices having a conflicting MAC address in a computer network. By configuring and managing the MEPs between the customer devices (CEs/CPEs) and the aggregation device through extensions to the Ethernet CFM protocol as described above, the novel techniques may notify a device that it has a MAC address which conflicts with another device in the same bridge-domain. In particular, the dynamic aspects of one or more embodiments described herein alleviate the need for cumbersome and inefficient manual management of MAC addresses, where if any customer device is improperly configured with an overlapping MAC address, the customer device would be so notified. In this manner, through Ethernet technology, a CE device that has been notified of a conflicting MAC address condition may prevent its traffic from being silently black-holed by the aggregation network, such as by raising an alarm (for an administrator) or by stopping the transmission of traffic.

While there have been shown and described illustrative embodiments that provide a feedback mechanism to customer devices having a conflicting MAC address, it is to be understood that various other adaptations and modifications may be made within the spirit and scope of the present disclosure. For example, the embodiments have been shown and described herein relating to current CFM protocol standards and related terms. However, the embodiments of the disclosure in their broader sense are not so limited, and may, in fact, be used with other suitable Ethernet management protocols. Further, while the down MEPs of the customer devices and aggregation devices are shown as port MEPs, generally, they may also be configured as virtual local area network (VLAN) MEPs, as may be appreciated by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at an aggregation device operable to aggregate traffic of a plurality of customer edge (CE) devices into a single bridge-domain, connectivity fault management (CFM) packets of a CFM protocol from the plurality of CE devices, each received CFM packet including a media access control (MAC) address of an access port of the CE device from which the CFM packet was transmitted;
   detecting conflicting MAC addresses between access ports of CE devices by comparing MAC addresses of the received CFM packets; and
   notifying one or more of the plurality of CE devices of the conflict.

2. The method of claim 1, wherein the CFM packets are received on one or more user network interface (UNI) ports of the aggregation device configured as down maintenance end points (MEPs), and the access ports of the CE devices are also configured as down MEPs.

3. The method of claim 1, further comprising:
   cataloging information from each of the CFM packets, including the MAC address of the access port of the CE device from which the CFM packet was transmitted, in a database at the aggregation device; and
   comparing MAC addresses of the database.

4. The method of claim 3, wherein the detecting further comprises:
   determining that a MAC address of a particular received CFM packet is already located within the database for a different CE device access port.

5. The method of claim 3, wherein the access ports of the CE devices are configured as down maintenance end points (MEPs), each CFM packet includes a MEP identifier (ID) of the down MEP from which the CFM packet was transmitted, and the detecting further comprises:
   determining that a MAC address of a particular received CFM packet is already located within the database for a different MEP ID than the MEP ID of the particular received CFM packet.

6. The method of claim 3, wherein the database is a maintenance intermediate point continuity check message database (CCMDB).

7. The method of claim 1, wherein the notifying comprises:
   transmitting a notification of the conflict to each CE device having an access port with a conflicting MAC address.

8. The method of claim 1, further comprising:
   receiving notification of the conflict at a particular CE device; and
   providing an indication of the conflict at the particular CE device.

9. The method of claim 8, further comprising:
   in response to the notification of the conflict, ceasing transmission of traffic on a conflicting access port at the particular CE device.

10. The method of claim 8, further comprising:
    in response to the notification of the conflict, changing a MAC address configuration of a conflicting access port at the particular CE device.

11. An apparatus comprising:
one or more ports configured to communicate with a plurality of customer edge (CE) devices;
a processor coupled to the ports and configured to execute software processes;
a memory configured to store a connectivity fault management (CFM) process that when executed is operable to:
examine connectivity fault management (CFM) packets of a CFM protocol received from the plurality of CE devices on the one or more ports, each received CFM packet including a media access control (MAC) address of an access port of the CE device from which the CFM packet was transmitted,
detect conflicting MAC addresses between access ports of CE devices by comparing MAC addresses of the received CFM packets, and
notify one or more of the plurality of CE devices of the conflict.

12. The apparatus of claim 11, wherein the one or more ports are user network interface (UNI) ports configured as down maintenance end points (MEPs), and the access ports of the CE devices are also configured as down MEPs.

13. The apparatus of claim 11, wherein the CFM process when executed is further operable to:
catalog information from each of the CFM packets, including the MAC address of the access port of the CE device from which the received CFM packet was transmitted, in a database stored in the memory, and
compare MAC addresses of the database.

14. The apparatus of claim 13, wherein conflicting MAC addresses are detected by determining that a MAC address of a received CFM packet is already located within the database for a different CE device access port.

15. The apparatus of claim 13, wherein the access ports of the CE devices are configured as down maintenance end points (MEPs), each CFM packet includes a MEP identifier (ID) of the down MEP from which the CCM was transmitted, and conflicting MAC addresses are detected by determining that a MAC address of a particular received CFM packet is already located within the database for a different MEP ID than the MEP ID of the particular received CFM packet.

16. The apparatus of claim 13, wherein the database is a maintenance intermediate point continuity check message database (CCMDB).

17. The apparatus of claim 11, wherein each CE device having an access port with a conflicting MAC address is notified.

18. A non-transitory computer-readable medium having software encoded thereon, the software when executed operable to:
process connectivity fault management (CFM) packets of a CFM protocol received from a plurality of customer edge (CE) devices, each received CFM packet including a media access control (MAC) address of an access port of the CE device from which the CFM packet was transmitted;
catalog information from each of the CFM packets, including the MAC address of the access port of the CE device from which the CFM packet was transmitted, in a database;
compare MAC addresses of the database;
detect conflicting MAC addresses between access ports of CE devices based on the comparison; and
notify one or more of the plurality of CE devices of the conflict.

19. The non-transitory computer-readable medium of claim 18, wherein the CFM packets are received on one or more user network interface (UNI) ports configured as down maintenance end points (MEPs), and the access ports of the CE devices as also configured as down MEPs.

20. The non-transitory computer-readable medium of claim 18, wherein the database is a maintenance intermediate point continuity check message database (CCMDB).

* * * * *